United States Patent
Knas et al.

(10) Patent No.: US 10,521,693 B1
(45) Date of Patent: Dec. 31, 2019

(54) SYSTEM FOR DISPLAYING DIGITAL MEDIA

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 49 days.

(21) Appl. No.: 15/829,661

(22) Filed: Dec. 1, 2017

Related U.S. Application Data

(60) Provisional application No. 62/429,024, filed on Dec. 1, 2016.

(51) Int. Cl.
| | | |
|---|---|---|
| *G06K 9/62* | (2006.01) | |
| *G06K 9/00* | (2006.01) | |
| *G06K 9/46* | (2006.01) | |
| *G06Q 30/02* | (2012.01) | |

(52) U.S. Cl.
CPC ....... G06K 9/6212 (2013.01); G06K 9/00302 (2013.01); G06K 9/00469 (2013.01); G06K 9/4671 (2013.01); *G06Q 30/0277* (2013.01)

(58) Field of Classification Search
CPC ............. G06K 9/6212; G06K 9/00302; G06K 9/00469; G06K 9/4671; G06Q 30/0277
See application file for complete search history.

(56) References Cited

U.S. PATENT DOCUMENTS

| | | | |
|---|---|---|---|
| 2008/0195664 A1* | 8/2008 | Maharajh | G06Q 10/10 |
| 2009/0119173 A1* | 5/2009 | Parsons | G06Q 10/107 |
| | | | 705/319 |
| 2009/0177670 A1* | 7/2009 | Grenier | G06F 16/9535 |
| 2010/0070485 A1* | 3/2010 | Parsons | G06Q 10/00 |
| | | | 707/709 |
| 2014/0089816 A1* | 3/2014 | DiPersia | G06F 3/0484 |
| | | | 715/753 |
| 2014/0207793 A1* | 7/2014 | Liu | G06Q 30/0277 |
| | | | 707/748 |
| 2014/0258169 A1* | 9/2014 | Wong | G06Q 30/0282 |
| | | | 705/347 |
| 2016/0188601 A1* | 6/2016 | Ganesamoorthi | G06F 19/324 |
| | | | 705/2 |
| 2017/0091692 A1* | 3/2017 | Guo | G06F 16/58 |
| 2017/0124593 A1* | 5/2017 | Nickerson | H04L 12/1859 |

* cited by examiner

*Primary Examiner* — Bhavesh M Mehta
*Assistant Examiner* — Ian L Lemieux
(74) *Attorney, Agent, or Firm* — Eric L. Sophir; Dentons US LLP

(57) ABSTRACT

Embodiments of this disclosure include systems and methods for tracking whether users recommend or dislike particular digital media, and presenting the digital media more or less prominently according to whether users recommend the digital media. Prominence can include the size or brightness of the digital media. It can also include duration or frequency of display, or how centrally located the digital media is or whether it is obscured, or appears sharp or blurry. Recommendations can come from a plurality of means, and can be normalized to generate a rank for each digital media, such that each digital media can be displayed more or less prominent based on the ranking.

20 Claims, 5 Drawing Sheets

SYSTEM FOR DISPLAYING DIGITAL MEDIA

CROSS-REFERENCE TO RELATED APPLICATIONS

This application claims priority to U.S. Provisional Patent Application Ser. No. 62/429,024, filed on Dec. 1, 2016, which is hereby incorporated by reference in its entirety.

TECHNICAL FIELD

This disclosure pertains to presenting digital media using a system for identifying or ranking them and presenting them according to one or more predefined criteria.

BACKGROUND

Digital photography and videography has become the dominant media in which people store their digital media. Many people carry cameras integrated with their smartphones, and therefore can conveniently take a nearly limitless number of photos. Indeed, some cloud services can provide unlimited data storage of photos essentially enabling users to take as many photos as possible. With that ability, people can take many photos that will likely not be desirable because they know that they can sort desirable pictures from undesirable pictures. In addition to photos, people can also do the same for other digital media, such as videos, including 3D videos, immersive video, and virtual reality (VR).

After recording digital media, the user can store the digital media locally or upload it to the cloud. Once stored, the digital media can automatically be processed. For example, the digital media might be edited to remove red eye (when people's eyes turn red from a flash), filtered somehow (e.g., made black and white), or collected into a collection of digital media from a particular day or location. For instance, if you take a vacation to Florida, a server on the cloud could use location information in the digital media to create automatically a collection of digital media from that location, and label the collection as a Florida vacation. In addition, photos can be processed to automatically identify people based on facial recognition software by comparing known faces to unknown faces.

Users can log onto various services to view the digital media stored in the cloud. The digital media can be sorted or unsorted. Sorted digital media can be sorted by date of creation, who is in the photo, location of creation, etc. Alternatively, systems can individually present digital media to users. These users can choose certain digital media to publish on the Internet, for example on a social network. Once on a social network, people who can view the digital media can identify whether they enjoy the digital media by making an indication, such as pushing a button signifying that the person recommends the digital media or finds it pleasing. For instance, Facebook® uses a "like" button, Google uses a "+1" button, and Twitter uses a "Favorite" button. The person could also provide comments on the digital media.

SUMMARY

The large volume of digital media being stored on the Internet presents a need to sort that digital media in some useful, automated way. Embodiments of this disclosure solve this problem by identifying digital media that is more preferred relative to other less preferred or disliked digital media. Embodiments can identify preferred digital media by the number of times people recommended the digital media or the number of comments or types of comments that the digital media received. Each file corresponding to digital media can be ranked according to how much it is preferred or not preferred. For example, users can make explicit and or implicit recommendation indications.

Users of the disclosed system can identify their preferences for certain images using one or more social networks or a proprietary system, or a combination of the two. People may also give digital media a more granular preference ranking rather than just a binary recommendation. For instance, users can rank images using a scale, such as 1-10. Users can also rank images by the time a user spends viewing an image or whether they chose to view it in a larger format. For instance, the system can display smaller images, such as "thumbnails," and when a user clicks on it the system can log that click to identify an interesting image. However, the system must take care because the reason for the interest may be that it is funny or embarrassing, and therefore a choice to look at a larger image does not necessarily identify the reason it is interesting. Therefore, the system can collect several inputs to make a more informed guess as to why the digital media was interesting.

Finding which digital media is interesting can be a difficult problem. Recommendations, clicks, and comments can all be input to the analysis of whether digital media is interesting and why it is interesting. With these inputs, the system can make inferences as to why the digital media was so interesting. For example, the system can look at the adjectives in comments to infer why others are recommending or looking at the digital media. Adjectives such as "gross," "disgusting," or "bad" can identify a photo that people find distasteful or otherwise negative, whereas comments including the words "beautiful," "amazing," or "great," can be considered positive comments.

After being automatically ranked, the system can request further manual input or approval. For instance, if the system will use the rankings to decide which digital media to display publically and in what way, the system can request final approval for display of the digital media. The approval can come from one or more administrators or the content creator. Once approved, the system can generate a display of the chosen digital media. These administrators may be able to modify the preference rankings by moving them up or down, or remove the digital media altogether to prohibit its further publication.

The system can sort the preferred digital media and present it according to its preference rank. Each preference rank can be associated with a certain way to present the digital media. For instance, digital media with a higher rank can be presented more prominently or frequently, whereas digital media with a lower rank can be presented less frequently or less prominently. In one embodiment, the digital media can be presented as a collage, where more preferred digital photos can appear larger than less preferred digital photos.

In one embodiment, a method comprises receiving, by a server, one or more digital media from a database; displaying, by the server, on one or more user computers the digital media with graphical input components for recommendation status and comment fields corresponding to respective digital media, wherein the graphical input components and comment fields are displayed in the one or more user computers via a graphical user interface and the graphical input components and comment fields are configured to receive user input; receiving, by the server, recommendation indications and comments from users operating the one or more user computers by interacting with the graphical input components and comment fields; storing, by the server, the recommendation indications and comments in the database; calculating, by the server, a score for respective digital media by normalizing recommendation indications and comments of the digital media; determining, by the server, a rank for respective digital media based on the score, storing, by the server, a corresponding ranking with each of the digital media in the database; generating and transmitting to a display device, by the server, instructions to display the digital media according to the corresponding ranking; displaying, by the server, the digital media according to the ranking on the display device; continuously monitoring, by the server, updated recommendation indications and comments of each digital media displayed on the display device; determining, by the server, an updated rank for each digital media based on the updated recommendation indications and comments; and updating, by the server, display presentation of the digital media on the display device based on the updated rank.

In another embodiment, a system comprises a database that stores the digital media; a display device; and a server, in communication with the database and the display device, configured to: receive the digital media from the database; display on one or more user computers the digital media with graphical input components for recommendation status and comment fields corresponding to respective digital media, wherein the graphical input components and comment fields are displayed in the one or more user computers via a graphical user interface and the graphical input components and comment fields are configured to receive user input; receive recommendation indications and comments from users operating the one or more user computers by interacting with the graphical input components and comment fields; store the recommendation indications and comments in the database; calculate a score for respective digital media by normalizing recommendation indications and comments of the digital media; determine a rank for respective digital media based on the score, store a corresponding ranking with each of the digital media in the database; generate and transmit to the display device, instructions to display the digital media according to the corresponding ranking; display the digital media according to the ranking on the display device; continuously monitor updated recommendation indications and comments of each digital media displayed on the display device; determine an updated rank for each digital media based on the updated recommendation indications and comments; and update display presentation of the digital media on the display device based on the updated rank.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate some embodiments.

DETAILED DESCRIPTION

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Figure 1:
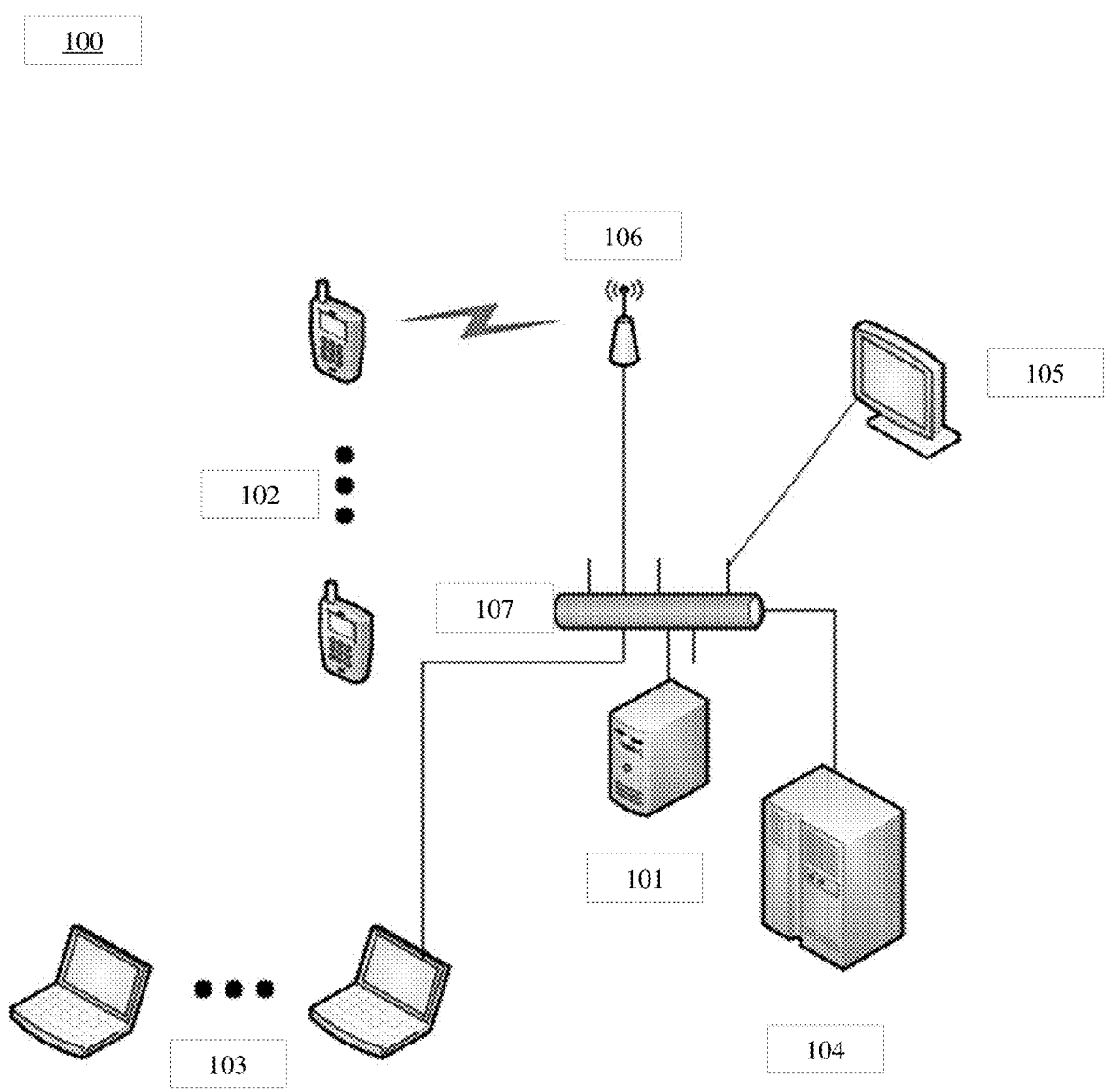
FIG. 1 illustrates a computer system for displaying digital media, according to an exemplary embodiment.

FIG. 1 illustrates a computer system 100 for displaying digital media, according to an exemplary embodiment. Embodiments of the present disclosure allow for usefully recording, sorting, and presenting digital media to users. Components of these embodiments can include special purpose equipment, such as that illustrated in system 100 of FIG. 1. System 100 includes network 107, such as the Internet, a proprietary local area network (LAN), or a combination of the two. Network 107 illustrated in FIG. 1 is simplified as one network for ease of discussion; however, network 107 can comprise a collection of several networks of different types communicating with one another. For example, wireless transceiver 106 creates a wireless network to communicate with mobile devices 102. Server 101 can be coupled to network 107 to communicate with various other devices. Mobile devices 102 can be capable of capturing digital media, including images, music, video, photos and virtual reality, which mobile devices can upload to server 101 by communicating to wireless transceiver 106, which in turn communicates with network 107 to server 101. Server 101 may then transfer or copy the digital media from mobile devices 102 to a digital media database 104. User computers 103 can retrieve the digital media by making a request, such as an HTTP GET request, to server 101, which may then either upload cached digital media to user computers 103, or server 101 may request the digital media from the digital media database 104 before uploading it to user computers 103. Note that user computers 103 can include other computing platforms in addition to personal computers, such as smart phones. User computers 103 can allow users to view, recommend, and comment on the digital media. For example, the server 101 may generate a graphical user interface on the user computers 103 which includes the digital media, a recommendation button and a comment field for each digital media. The server 101 may receive recommendation indications and comments from the user computer 103, and save the received information into the database 104. The server 101 may update the record corresponding to each digital media in the database 104 when receiving new recommendation indications and comments. The server 101 may also sort the digital media based on the corresponding records in the database 104 of digital media.

Figure 2:
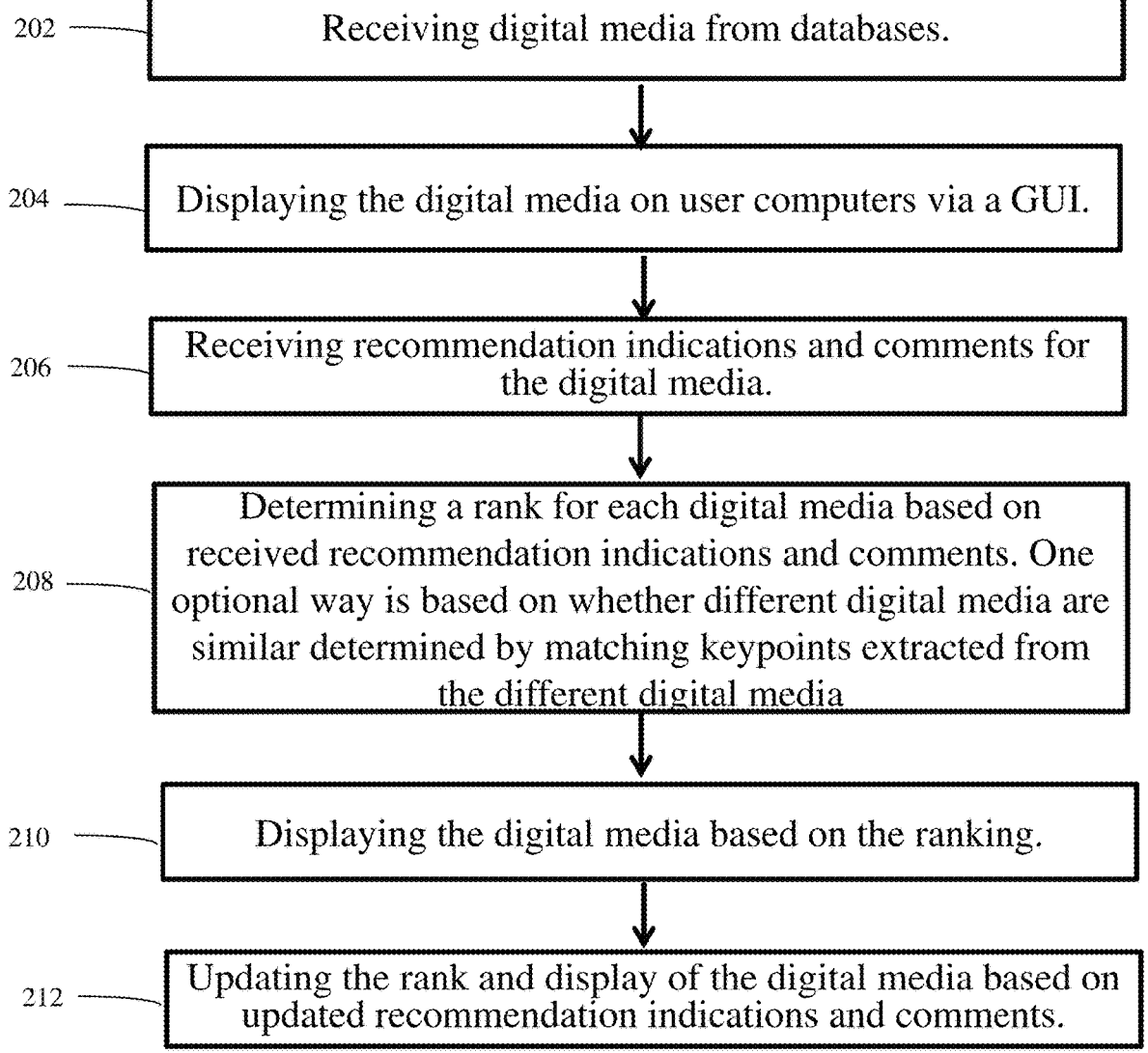
FIG. 2 illustrates a flow chart depicting operational steps for displaying digital media, according to an exemplary embodiment.

FIG. 2 illustrates a flow chart 200 depicting operational steps for displaying digital media, according to an exemplary embodiment. One having ordinary skill in the art would appreciate that other embodiments may comprise additional or alternative steps, or may omit some steps altogether.

At step 202, the server may receive digital media from internal digital media databases or external databases. In one embodiment, the server may retrieve an internal digital media database that is configured to store the digital media received from different mobile devices. In another embodiment, the server may receive the digital media from external sources, such as social media networks. For example, the server may receive the digital media by web crawling and scanning one or more social media networks.

Figure 3:
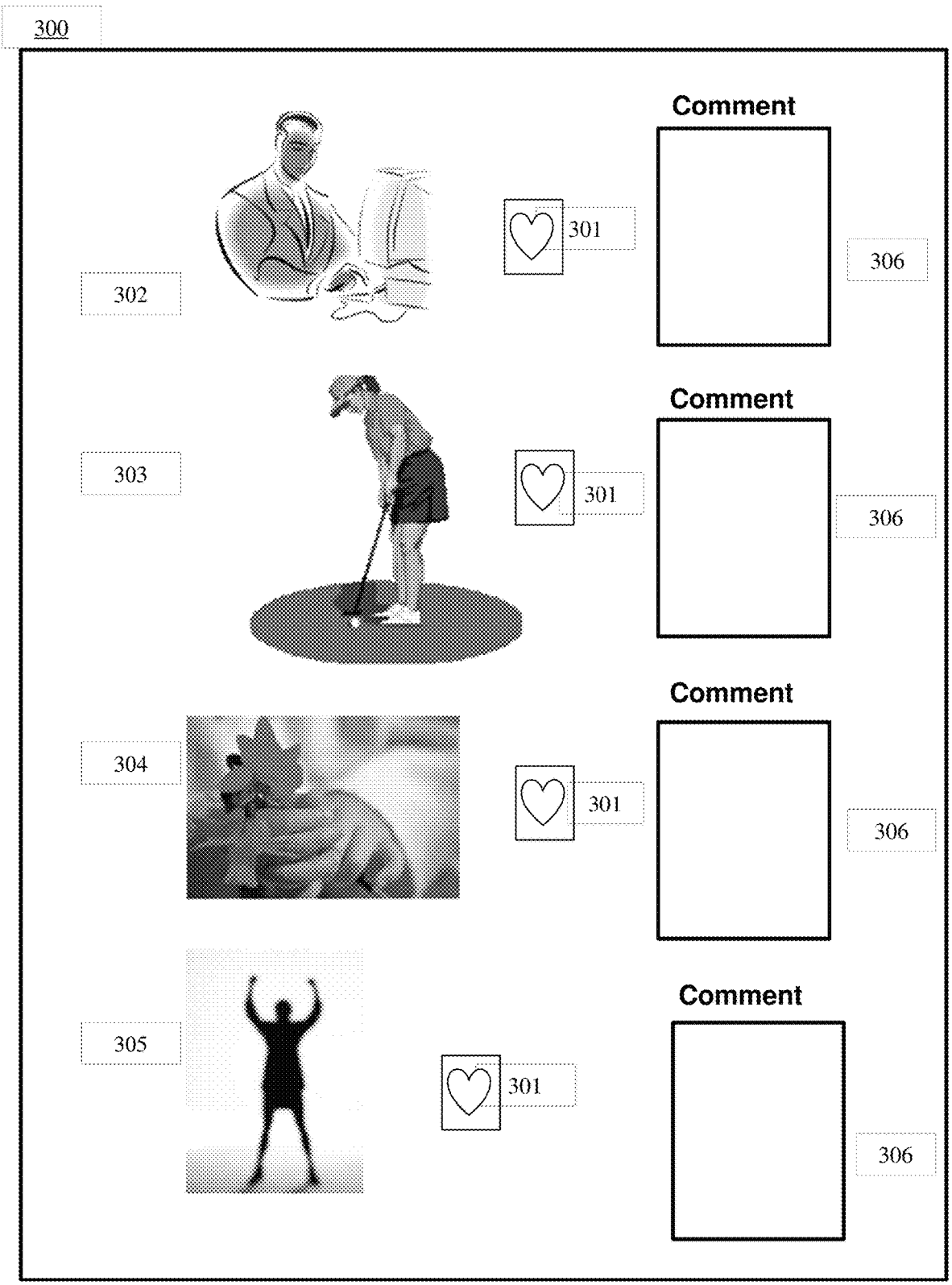
FIG. 3 illustrates a graphical user interface for receiving recommendation indications and comments for digital media, according to an exemplary embodiment.

At step 204, the server may display the digital media on the user computers via a graphical user interface. The graphical user interface may include the received digital media, and a graphical input component and a comment field for each digital media. For example, the graphical input component may be a recommendation button or a smiley face for recommendation status. A user may choose to switch on or off the recommendation button via a mouse click or a press on a touchscreen. The comment field may be a text box where the user may be able to input comments. FIG. 3 is an example of displaying the digital media on a graphical user interface for receiving recommendation information.

At step 206, the server may receive recommendation indications and comments for the digital media. When different users operating the user computers interact with the graphical input components and the comment fields via the user interface, the server may receive the inputs from the users. In some embodiments, the users may give explicit information regarding their interest in the digital media, such as the recommendations and comments, or they may give implicit information concerning their interest in the digital media. Examples of implicit interest include clicking on digital media to view larger versions of the digital media. Viewing a larger version of an image reflects some interest in the image, though it can be unclear to the server why the user was interested in the image. Perhaps the image includes a familiar person or an exciting or interesting activity. The act of enlarging an image by itself might not clearly identify the reason for the interest, but can be an indication that the image is interesting. The server can use both explicit and implicit information received from user computers to sort the digital media.

Sometimes recommendation indications do not necessarily mean that the user making the recommendation actually thinks the digital media is good. For example, the digital media can signify that the person experienced a traumatic event, and a friend might recommend the digital media as a show of support rather than a recommendation of the digital media. The server can process explicit and implicit information corresponding to the digital media to discern between true recommendations and other reasons for signifying a recommendation. For example, the server can parse comments received in comment fields for keywords that identify the reason that the digital media received recommendations.

Recommendation indications can include many different forms of explicit or implicit information about users' like or dislike of certain digital media. As explained above, these recommendation indications can include rankings, likes, comments, viewing time, number of copies uploaded, up-votes (swipe left), down-votes (swipe right), etc. The system and method can collect all of these recommendation indications to sort digital media based on whether people like the digital media.

The server may receive the comments from the user and determine the reasons for recommendations based on the comments, such as consolation, dislikes, offensiveness, meme, bullying, etc. If the comments include words or phrases of consolation, such as "get well soon," "feel better," and "prayers," then the server can presume that the digital media is for consolation. The server may identify dislikes by looking for keywords such as "dislike," "grouse," "disgusting," etc. The server may identify offensiveness by looking for keywords such as "remove" or "delete." The server may identify memes by comparing the digital media to a database of memes, such as that on http:\\knowyourmeme.com. The server may identify bullying by looking for keywords such as "nerd," "jerk," "geek," "looser," "fat," etc. In addition to keywords, the server may also look at implicit information, such as whether users requested larger images or playback of the digital media. A lack of or low number of requests for larger images or playback can correlate to offensiveness or dislike. The server can count each time there is a request for a larger version of or playback of the digital media. Therefore, the server can look at bolt explicit and implicit information corresponding to digital media to make inferences or assess whether users actually recommend it.

Recommendation indications can come from a proprietary ranking service, from a third-party social network via an application programming interface (API), from email, phone call, or any method for receiving input from users on the digital media. All of these recommendation indications can be tallied and normalized to create a ranking for the digital media. Examples of social network APIs include Facebook® and Twitter®, which can allow access to data on their sites. This can include a "firehose," e.g., all or a large portion of data entered on these social networks, or can include a subset of information from these social networks, e.g., accounts a user follows, user name, and photos. The server can request a user's user name and password for these services to post digital media or receive recommendation indications from these third-party social networks. If a user uploads digital media to server, the server can upload the digital media to other social networks and monitor recommendation indications received on those various social networks.

At step 208, the server may store the received recommendation indications and the comments into the digital media database and determine a rank for each digital media. The digital media database may store the digital media and all the received information and other parameters regarding each digital media. For example, the digital media may have a number of parameters associated with it, including the received recommendation indications, the comments, and the reasons for recommendations. Other parameters may include a score, a rank determined based on the received information. The server may update the parameters in real-time or when needed. The database may have associated methods for pulling the information concerning the digital media file. The server may store the received recommendation indications and comments into the database based on the identifier of each digital media.

Alternatively, information collected on how interested people are in the digital media can be stored locally on user computers or transmitted to be recorded on server. If stored locally on user computers, then user computers can periodically transmit the information to server to be combined with other information collected regarding how interested people are in the digital media. The information can be stored as meta data within the digital media. For example, data can be stored between the SOI and EOI markers in a JPEG file. The server can update this metadata any time it changes, either by receiving a request from the user computers or by receiving a JPEG file with updated metadata. For example, user computers could update the metadata in digital media and then retransmit the digital media to server, which could then read the metadata, and record the changes in a copy of the digital media.

The server may determine a rank for each digital media based on a number of factors. The server may be a special purpose computer because it includes specialized software that can, for example, process either or both of the explicit and implicit information about the digital media. For example, the server may simply sort the digital media by the number of recommendations received.

In some embodiments, the recommendation indications need not be simply binary, but can be more granular, e.g., numerically 1-10 or smiley faces that appear happier corresponding to higher recommendations. The smiley faces can be assigned corresponding numerical values. In this way, the server can count the recommendation values, whether binary or numerical, and rank the digital media based on the recommendation indications. However, the method for processing the explicit or implicit information can consider other factors.

The server may calculate a score for each digital media and sort or rank the digital media based on the corresponding scores. To calculate a score, the server may assign a weight value to each attribute and further standardize and normalize the recommendation indications received from the users. Certain attributes can be weighted more heavily than others can. For example, likes can be weighted more heavily than clicks to view larger images. Likes can be counted twice in an average. In one embodiment, if two inputs are number of likes and number of clicks, the system can add the number of likes twice, and add that number to the number of clicks, and divide by three to get the normalized, weighted average.

For recommendation indications received from third-party social networks, the server may standardize and normalize the recommendation indications by the posted social networks, for example, giving more weight to recommendation indications from one social network over another. For example, a recommendation indication on a first social network can be weighted more heavily than a recommendation indication from a second social network, such that recommendation indications have a 1.2× increase in importance. Of course, other increases in importance are possible, and could be user-configurable. The APIs can allow for polling of recommendation indications, in which case the server can periodically poll the social networks, e.g., request an update every 24 hours. Alternatively, the APIs can allow for instantaneous updates, such that the server receives updates in real time.

The recommendations indications can be normalized into a numerical score, either positive or negative, and added together or weighted and averaged to determine a final score. Normalization can include, for example, turning comments into scores. As previously described, certain terms can have positive or negative connotations. Those words can have associated numerical scores to be normalized with likes and clicks. These numbers can be weighted and added to come up with a standardized and normalized ranking for the digital media.

The server can have various subroutines for processing the digital media file in the ways described above. For example, the server can use a sorting algorithm specifically designed to sort digital media files based on their internal "recommendations" value. The algorithm can further sort digital media files by their comments string. As explained above, the comments string can have several comments concatenated either together in a large string, or an array of strings, where each element in the array includes a new comment.

The server can also have various image processing subroutines to determine the content of the digital media file. For example, the image processing subroutines can identify the types of images in the digital media file. If the digital media file contains flowers, cars, buildings, mountains, etc., the image processing subroutines can recognize such content. Such recognition can occur using repetitive learning techniques. For example, the server can process a library of known pictures of flowers to identify traits associated with flowers. Once identified, the server can compare those traits to other digital medial files, whether video or still pictures, to identify objects that also have those traits, and therefore understand that those digital media files have flowers in them. Similar processes can occur for other items, including cars, buildings and mountains. The system can also identify facial expressions in a similar way, such as smiling, frowning, crying, and yelling.

The server can also associate known certain images with either positive or negative connotations. For example, flowers can have a positive connotation, whereas bombs would have a negative connotation. These connotations are subjective, and can be changed. For instance, someone may have distaste for flowers and a liking of bombs, and therefore the positive or negative connotations are exemplary, and may be changed to implement others' subjective views. These types of images can have associated positive or negative prioritization information, e.g., a positive or negative numerical value, which can be standardized and normalized with other recommendation indications. For example, a positive image, such as a flower, can have a higher value than a sad face. Nonetheless, when set, the system can use these positive and negative connotations to provide enhanced ranking of digital images. For example, digital media containing people smiling can be ranked over digital media containing people frowning.

Multiple people can upload digital media to be ranked, and all of the digital media can be ranked together. If multiple people submit similar images, that can be an implicit notice that the images is more interesting. This can also be true when only a single person submits images. However, multiple people submitting the same picture is a more objective indication because more than one person found the image interesting.

The server can rank digital media based on whether the digital media is similar. For example, the server can perform an image recognition algorithm by, for example, extracting keypoints (e.g., a selected region or point) in an image using a scale invariant feature transform (SIFT) algorithm. The server can then match the identified keypoints with keypoints of other images. If there is a match, the server can increment a counter to identify the number of times the server identified similar images.

Other embodiments can use different algorithms for identifying similar images, including a histogram method which includes creating several buckets corresponding to features of an image, such as color, contrast, brightness, and texture. Each feature can have several buckets. The server 101 can then compare the buckets to determine whether they are sufficiently similar, e.g., have similar sizes within a predetermined range, to mean that the images are the same. Another image recognition algorithm includes identifying keypoints and placing them in randomized trees or other non-hierarchical data structure to perform a searching algorithm to more quickly identify matches, and use a statistical method, such as a principal component analysis (PCA) or Gaussian model, to avoid having to match all keypoints and have a reasonable certainty that the images match. This method can save time by not having to match all keypoints. Instead, when the matching keypoints from two images satisfy a threshold value, the server may determine the images match and increment the counter. Irrespective of which algorithm to use for image matching, the counter can be incremented to identify matches, and that information can be normalized with other recommendation indications to generate a normalized and standardized ranking of the digital media.

The server can rank digital media higher or lower based on its length. For instance, if display device is meant for short interactions, e.g., a few minutes, then it would not be practical to expect users to watch or listen to an hour long digital media file. Therefore, the server may rank digital media having shorter run times higher than digital media having longer run times. That is, digital media having a run time of less than a minute would rank higher than digital media having a 10-minute runtime. The server can weigh times granularly; for example, every additional 10 seconds of runtime constitutes one point of lower ranking. While images do not have runtimes, they can be ranked, just as audio or video digital media can, and the rankings can therefore be normalized to rank images against audio and video digital media. After calculating a score for each digital media and rank the digital media based on the scores, the server may store the determined score and rank for each digital media into the digital media database.

Figure 4:
FIG. 4 illustrates a graphical user interface displaying a first collage of photos, according to an exemplary embodiment.
Figure 4:
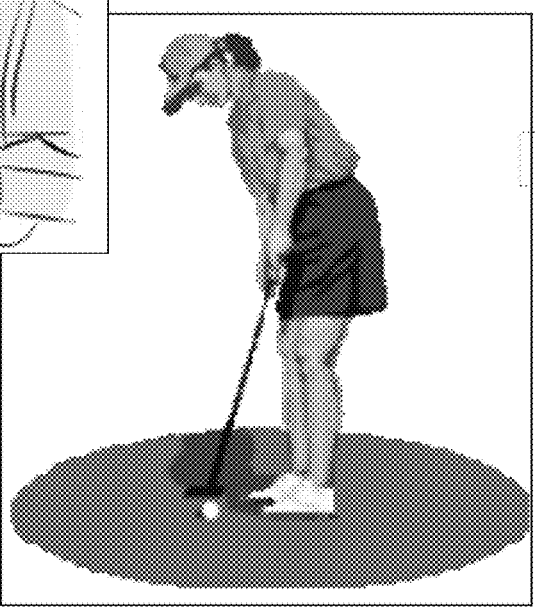
Figure 4:
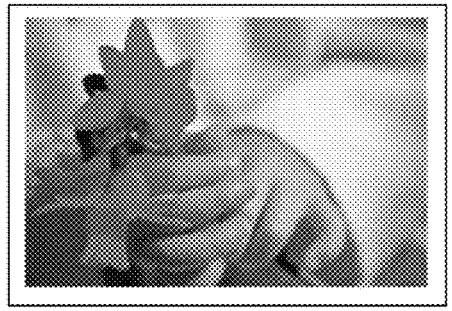
Figure 4:
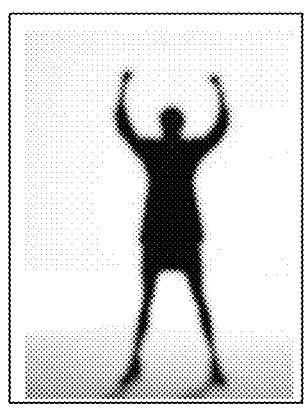
Figure 5:
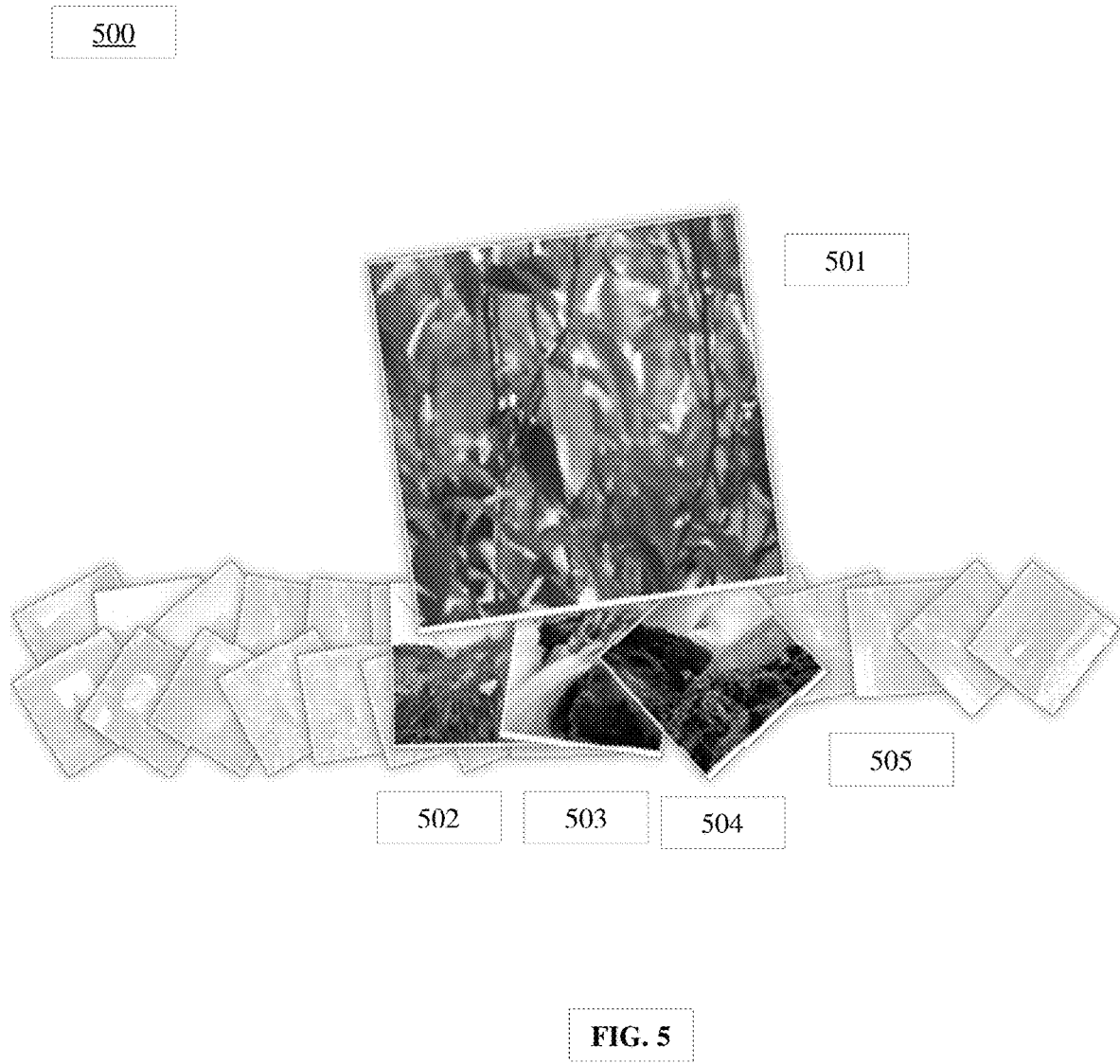
FIG. 5 illustrates a graphical user interface displaying a second collage of photos, according to an exemplary embodiment.

At step 210, the server may display the digital media on display devices based on the ranking. Specifically, the server may rank the digital media based on the respective score. Once all digital media has normalized ranking, the server may display the digital media based Ion the ranking where the higher ranking digital media are displayed with more prominent placement. FIGS. 4 and 5 are examples of displaying the digital media according to the ranking.

Digital media that can be played can have an overlaid play symbol or triangle (▶), commonly understood to be a "play" button, such that a click on the digital media will begin playback. In this way, all digital media can be presented together, such as in a collage, and presented more or less prominently based on respective rankings.

The server may make digital media files more or less prominent in several ways. The server may determine a presentation scheme based on the ranking, so that the higher-ranked digital media can be presented more prominently than lower-ranked digital media. For instance, digital medial files can appear larger or smaller, such that higher ranking digital media appears larger if it has a higher ranking. They can appear clear, faded, or blurry, such that higher-ranking digital media can appear clearer or shaper. The frequency of appearance during display of different digital media can vary, such that digital media having a higher ranking can appear more frequently in a slideshow or be played more often in the case of a video. The brightness of the digital media might change based on its rank, such that higher ranked digital media will appear brighter than lower ranked digital media. Prominence can also include placement in a collage. For example, higher-ranking digital media may appear closer to the center or near the top of a collage, whereas lower-ranked digital media may appear smaller and near the bottom of the collage. Prominence can also include how long the system displays a particular digital media. More prominent digital media can be displayed for a longer period of time than less prominent digital media.

At step 212, the server may update the rank and display presentation of the digital media based on updated recommendation indications and comments. Even after creating the collage, the server can continue to collect recommendation information about the digital media. For instance, each click on a digital media of collage can constitute new information regarding the recommendation indications, such that the collage can be remade when new information is retrieved. If one of digital media in collage receives several clicks, the server can recreate collage to place that digital media file in a more prominent position. Similarly, if one of digital media receives fewer clicks, then server may assume that that digital media is less recommended and possibly place that digital media with the less prominent digital media. The server can remake collage at a particular time of day, such as midnight, or at any time upon receiving a request, or in real time. Specifically, the server may continue to collect updated recommendation information about the digital media, determine an updated rank for each digital media based on the updated recommendation indications and comments, and update the display presentation of the digital media on the display device based on the updated rank. In the meantime, the server may update the digital media database with the updated recommendation information and the updated rank for the corresponding digital media.

In some embodiments, when the number of clicks satisfies a threshold value (e.g., a predetermined number), the server may trigger certain events. Such events may include remaking collage, such that the rankings and appearance of digital media will be reassessed, possibly resulting in a different collage. Another event can include displaying an advertisement upon receiving a certain number of clicks. For instance, after every 10 clicks, display device can display an advertisement. Display device can also include a camera, either integrated or external, that can track the time a user spends interacting with display device. If a user interacts with display device for a certain period of time, e.g., 3 minutes, then display device can present an advertisement. Display device can track how long a user spends in front of display device by looking for facial features, such as eyes or nose, and display device can also include a timer (or the server can monitor the camera and maintain the timer) that tracks time when a pair of eyes is in front of display device. When the pair of eyes, leaves, the timer can reset. Alternatively, display device can maintain a timer for unique pairs of eyes, such that a running timer can be maintained for individual users. So that a user will receive an ad after 3 minutes of viewing, irrespective of whether those three minutes were continuous or spaced apart in smaller chunks.

FIG. 3 illustrates a graphical user interface 300 for receiving recommendation indications and comments for digital media. For example, user computers can present a page 300 illustrated in FIG. 3. Page 300 includes images 302-305. Each image 302-305 has corresponding recommend buttons 301 and comment fields 306. Recommend buttons 301 may toggle off and on in response to a user selection. The user selection can be via a mouse click or a press on a touchscreen. Users can also provide comments on the digital media 302-305 via respective comment fields 306. When the user is done commenting on or recommending the digital media 302-305, the recommendations and comments can be uploaded to the server, which may then store the information in a local database or the discrete database.

FIG. 4 illustrates a graphical user interface 400 displaying a first collage of photos, according to an exemplary embodiment. Once ranked, the serve can decide how to present the digital media by, for example, presenting it on display devices. For example, the digital media can be presented in the form of a collage 400 as illustrated in FIG. 4. FIG. 4 has exemplary digital media 401-404. Digital media 401-404 is the same as illustrated in FIG. 3, except that the digital media is presented according to its rank. The server may have assigned the following exemplary rankings of 1-100 to the digital media files 401-404:

Digital media file 401—67
Digital media file 402—90
Digital media file 403—49
Digital media file 404—22

Once each of the digital media files is ranked, they can be assigned corresponding representations. For example, the server may include representation assigned per ranking. Such representations can be separated into a predefined number of groupings, such as 4. In the example of 4 groupings, digital media would appear more or less prominent depending on which quartile its rank was. The highest quartile gets the most prominent placement, and the lowest quartile gets the least prominent placement.

In the illustrative collage of FIG. 4, digital media 402 has the highest rank and therefore the most prominent placement near the center of the collage. Digital media 401 has the next-highest ranking, and therefore also appear relatively large compared to digital media 403 and 404. Digital media 403 is the next-highest ranked, and appears slightly smaller than digital media 401 and 402, and is also slightly faded. Finally, digital media 404 has the lowest rank and appears smallest and near the bottom of the collage.

FIG. 5 illustrates a graphical user interface 500 displaying a second collage of photos, according to an exemplary embodiment. FIG. 5 illustrates an alternative embodiment in which a collage 500 is displayed in a different way. In this embodiment, digital media 501 appears most prominently because it is ranked the highest. Digital media 502-504 appear in the second-most prominent position, underneath digital media 501. Digital media 502-504 can have similar rankings, where digital media 504 can have the highest ranking of the three because it appears on top of digital media 503 and 502, whereas digital media 503 appears on top of digital media 502 and underneath digital media 504. There are several other digital media 505 that appear smaller and slightly faded relative to digital media 501-504. When any image is clicked, it can move into a more prominent position, such as at the most prominent position that digital media 501 occupies in collage 500. Alternatively, digital media that is clicked may cause a larger version to appear; the position of digital media in the collage is otherwise unmodified.

Display devices may also allow users to take pictures using the camera, and those pictures can be integrated into collage 500. The server may can also place these new pictures on social media web page, such as page 300 in FIG. 3, to obtain additional information of whether others recommend the digital media. When the ranking of any new digital media improves, the server may display such digital media more prominently after re-presenting all of the digital media.

The server may process, rank and present several different types of digital media at once. Such digital media can include images, music, video, or virtual reality. Each of these different types of digital media can be ranked in a normalized fashion, e.g., ranking based on recommendations and comments. Recommendations and comments can be agnostic as to the type of digital media being presented. For example, users can recommend any type of digital media by clicking a "like" button or assigning a recommendation value of 1-10. However, certain other attributes, such as length of an audio or video file, can be taken into consideration for the ranking.

In an alternative embodiment, the display device can be a computer integrated with a display, e.g., a tablet computer running an operating system such as iOS®, Android®, or Windows®. This embodiment can otherwise be similar to that illustrated in FIG. 1, or the display device may store all the software and rankings necessary for presenting the digital media based on respective rankings without a connection to the Internet. In embodiments where the display is not connected to the Internet, users can upload rankings or digital media to the display device via a cable or wireless connection.

The display device may also have the ability to push information to nearby mobile devices. The display device can do this by sending messages over WiFi, Bluetooth, or Bluetooth Low Energy (BLE). When a mobile device comes within range, the display device may transmit a message suggesting that the user visit the display device to view the digital media, or the message can include instructions for interacting or uploading digital media to the display device. The message can explain how to rank the digital media on the display device. Alternatively, the message can include a link to a website for ranking the digital media on the user's mobile device. The rankings inputted into the user's mobile device can be uploaded to the website and then sent to the display device, which can then modify the display based on receiving new digital media or rankings.

In still further embodiments, the display device can be replaced by a BLE transmitter that requires users to use their personal mobile devices to view and rank the digital media. The system and method described above would be generally the same, except that there would be no public display for people to interact with. Instead, the system and method relies on others' personal mobile devices—similar to a Bring-Your-Own-Device (BYOD) system. This method could also deliver advertisements as described above.

Other methods of monetizing the systems and methods described above include tracking and collecting personal information about the user interacting with the system and method. For instance, the systems and methods can require that users login using a social network login (e.g., Facebook, Twitter, LinkedIn, and Google). These services can return information about the user, such as gender, age, location, etc. These social networks can also allow third parties to post directly to user's personal networks. In this way, the systems and methods can post advertisements to the user's social network. If a user creates digital media for display and ranking, the digital media can contain a watermark, e.g., an advertisement or company logo.

The user can have the option of uploading the digital media to display device 105 or the digital media can be uploaded to one or more of the user's social networks or third-party websites. For instance, a user might see a particularly interesting picture and wish to tweet it on Twitter. The picture would then be publically accessible and could include an advertisement on it, thereby creating many valuable impressions of the advertisement.

The system and method can also request that users download one or more applications to their mobile devices. The one or more applications can enable the user to record or edit digital media for submission to the display device and for ranking. Editing digital media can include applying certain filters, such as sepia, black-and-white, etc., cropping, enlarging, zooming, etc. Once recorded and edited, the user can post the digital media to the display device for further ranking.

Alternatively, users can download the application themselves without any automatic prompt. For instance, users can learn about the application through an online application store, such as iTunes or the Google Play Store. Users that download the application can interact similarly as described above, except that instead of having a centralized public display device for interacting with digital media, users can interact with the digital media via their personal mobile devices or computers.

Embodiments in which users have an application stored on their mobile devices can be beneficial because it reduces the cost of establishing such a system, and users can use the application in many situations, such as weddings, funerals, corporate events, or outings with friends or family.

Certain embodiments can allow users to download media that was previously uploaded by other users. The media can be filtered or edited and uploaded again. Users can also store the digital media for their personal use and viewing. The users may also post the digital media to their own social networks.

Some embodiment can apply permissions to the digital media, such that users can interact differently with certain digital media. For instance, some digital media may not be available for download or reposting, other digital media may not be editable, but may be downloadable, or vice versa. Other permissions include the number of times digital media can be viewed, or whether the digital media is ephemeral. Users can upload digital media that can disappear after a certain amount of time, e.g., 30 seconds or 3 days. Still further permissions include who can view certain content. For example, only users connected via a social network with the creator of the digital media may view the digital media. Alternatively, the user can assign a password to the digital media, or identify particular people who can view the digital media.

Some embodiments can automatically group pictures based on, for example, location, time of day, people in pictures, or people taking pictures. Once grouped, the system and method can post the pictures in different galleries or walls, and displayed according to ranking as discussed above. For example, pictures taken at a company holiday party by employees can be grouped together. The pictures of the holiday party can be grouped by different teams taking pictures. The system can automatically determine whether a digital media is from a holiday party based on the time and location of the digital media. Other information, such as who recorded the digital media, can be used to infer whether the image is from a holiday party. Additionally, large corporations can have many teams that might not know each other, and therefore people might only be interested in digital media associated with their particular team. Therefore, the systems and methods can group digital media still further by teams within a corporation.

In another example, the systems and methods can group pictures based on other similarities, such as how much sunlight is in the picture. Pictures taken in broad daylight can be grouped together because they are temporally similar, the same can be true for pictures taken at night. Pictures can also be sorted based on content. For example, pictures of flowers can be prioritized over pictures of people. A user can input this prioritization information into a web browser or a server, such that the server can rank digital media based on the prioritization information.

When the server receives digital media, it can request that the user enter keywords about the subject matter of the digital media. In addition or in the alternative, the server can perform image recognition to identify or confirm the subject matter of the digital media. In the cause of digital media that contains audio, the server can also perform audio recognition to identify keywords to determine the subject matter of the digital media. Once the server determines the subject matter of the digital media, it can rank the digital media based on the corresponding prioritization received from the user. Once ranked, the server can calculate a presentation scheme, such as those illustrated in FIGS. 4 and 5. Finally, the server can transmit the presentation scheme and digital media to a display, either attached to the server or located remotely from the server.

Certain embodiments can also identify whether other users are viewing particular digital media. In a simple example, two users could be viewing digital media in a collage, and the particular digital media that a user is focusing on at any time can be framed with a color for the other user. The framing can be by providing a bolded or colored frame around the digital media. The user can then view the same digital media, and possibly get information about who is viewing that digital media. The color of the frame can be associated with a particular user. For example, Sue is associated with the color purple, while Igor is associated with the color red. When Sue sees digital media framed with the color red, then she knows that Igor is viewing that digital media. The system can also track which digital media each user has viewed, so that other users can view the same digital media.

The system includes a network, which is any common communication architecture that facilitates communication between computing devices using a network communication controller and a communication network. For example, the computing devices communicating over the network would be the one or more receiving devices, one or more transmitters, a network server, and one or more databases. One having ordinary skill in the art would appreciate that the network may be the Internet, a private intranet, or some hybrid of the two. The network may be comprised of any combination of devices and protocols capable of facilitating communication between computing devices. Non-limiting examples of devices comprising the network may include routers, switches, hubs, firewalls, proxy servers, telecommunications trunks, and the like. Non-limiting examples of protocols employed by the network may include TCP/IP, Wi-Fi, Bluetooth, 3G, Wi-Max, and the like. Wireless communication between one or more user receiving devices and one or more transmitters may be performed with a relatively short-range wireless communication protocol such as Wi-Fi, Bluetooth, high frequency systems, or other relatively localized wireless communication protocols.

The receiving device may be, for example, any mobile computing device with one or more web browsers or other specific applications. Other non-limiting examples of receiving devices include tablets, smartphones, and other electronic computing devices. It should be appreciated that the software modules described herein may be distributed among the devices of the system in varying permutations.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a server, one or more digital media from a database;
   displaying, by the server, on one or more user computers the digital media with graphical input components for recommendation status and comment fields corresponding to respective digital media,
      wherein the graphical input components and comment fields are displayed in the one or more user computers via a graphical user interface and the graphical input components and comment fields are configured to receive user input;
   receiving, by the server, recommendation indications and comments from users operating the one or more user computers by interacting with the graphical input components and comment fields;
   storing, by the server, the recommendation indications and comments in the database;
   extracting, by the server, keypoints from each digital media;
   determining, by the server, a number of similar digital media based on one or more matching keypoints extracted from each respective digital media satisfying a threshold;
   calculating, by the server, a score for respective digital media by normalizing recommendation indications and comments of the digital media and the number of similar digital media;
   determining, by the server, a rank for respective digital media based on the score,
   storing, by the server, a corresponding ranking with each of the digital media in the database;
   generating and transmitting to a display device, by the server, instructions to display the digital media according to the corresponding ranking;
   displaying, by the server, the digital media according to the ranking on the display device;
   continuously monitoring, by the server, updated recommendation indications and comments of each digital media displayed on the display device;
   determining, by the server, an updated rank for each digital media based on the updated recommendation indications and comments; and
   updating, by the server, display presentation of the digital media on the display device based on the updated rank.

2. The method of claim 1, further comprising:
   receiving, by the server, prioritization information, from the one or more user computers, wherein the prioritization information comprises a description of subject matter and a corresponding prioritization;
   determining, by the server, a subject matter associated with respective digital media using image recognition and audio recognition, and
   upon determining the digital media containing the subject matter described in the prioritization information,
      ranking, by the server, the digital media containing the subject matter of the prioritization information based on the corresponding prioritization.

3. The method of claim 1, further comprising:
   determining, by the server, a presentation scheme of the digital media based on the ranking; and
   displaying, by the server, the digital media according to the presentation scheme on the display device.

4. The method of claim 1, further comprising:
   receiving, by the server, the recommendation indications and comments via an application programming interface on a third-party website.

5. The method of claim 1, wherein the recommendation indications include whether the server received matching copies of digital media from different users.

6. The method of claim 1, further comprising:
   displaying, by the server, one or more advertisements to users viewing the digital media on the display device.

7. The method of claim 1, wherein the server receives recommendation indications and comments from one or more social networks, with each social network having a different weight.

8. The method of claim 1, further comprising:
   determining, by the server, a recommendation value for each digital media by parsing comments for keywords and making inferences and assess on whether users recommend the digital media.

9. The method of claim 1, further comprising:
   assigning, by the server, a weight value to each of one or more attributes associated with the digital media; and
   calculating, by the server, a score for each digital media by standardizing and normalizing the weight values of the one or more attributes.

10. The method of claim 1, further comprising:
    updating, by the server, the display presentation of the digital media based on the updated rank periodically.

11. A system comprising:
a database that stores the digital media;
a display device; and
a server, in communication with the database and the display device, configured to:
receive the digital media from the database;
display on one or more user computers the digital media with graphical input components for recommendation status and comment fields corresponding to respective digital media,
wherein the graphical input components and comment fields are displayed in the one or more user computers via a graphical user interface and the graphical input components and comment fields are configured to receive user input;
receive recommendation indications and comments from users operating the one or more user computers by interacting with the graphical input components and comment fields;
store the recommendation indications and comments in the database;
extract keypoints from each digital media;
determine a number of similar digital media based on one or more matching keypoints extracted from each respective digital media satisfying a threshold;
calculate a score for respective digital media by normalizing recommendation indications and comments of the digital media and the number of similar digital media;
determine a rank for respective digital media based on the score,
store a corresponding ranking with each of the digital media in the database;
generate and transmit to the display device, instructions to display the digital media according to the corresponding ranking;
display the digital media according to the ranking on the display device;
continuously monitor updated recommendation indications and comments of each digital media displayed on the display device;
determine an updated rank for each digital media based on the updated recommendation indications and comments; and
update display presentation of the digital media on the display device based on the updated rank.

12. The system of claim 11, wherein the server is further configured to:
receive prioritization information, from the one or more user computers, wherein the prioritization information comprises a description of subject matter and a corresponding prioritization;
determine a subject matter associated with respective digital media using image recognition and audio recognition, and
upon determining the digital media containing the subject matter described in the prioritization information,
rank the digital media containing the subject matter of the prioritization information based on the corresponding prioritization.

13. The system of claim 11, wherein the server is further configured to:
determine a presentation scheme of the digital media based on the ranking; and
display the digital media according to the presentation scheme on the display device.

14. The system of claim 11, wherein the server is further configured to:
receive the recommendation indications and comments via an application programming interface on a third-party website.

15. The system of claim 11, wherein the recommendation indications include whether the server received matching copies of digital media from different users.

16. The system of claim 11, wherein the server is further configured to:
display one or more advertisements to users viewing the digital media on the display device.

17. The system of claim 11, wherein the server receives recommendation indications and comments from one or more social networks, with each social network having a different weight.

18. The system of claim 11, wherein the server is further configured to:
determine a recommendation value for each digital media by parsing comments for keywords and making inferences and assess on whether users recommend the digital media.

19. The system of claim 11, wherein the server is further configured to:
assign a weight value to each of one or more attributes associated with the digital media; and
calculate a score for each digital media by standardizing and normalizing the weight values of the one or more attributes.

20. The system of claim 11, wherein the server is further configured to:
update the display presentation of the digital media based on the updated rank periodically.

* * * * *